Figure 1:
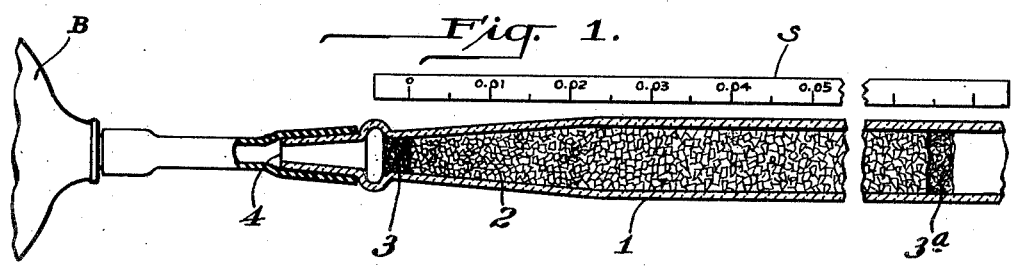

Sept. 26, 1939.   J. B. LITTLEFIELD   2,174,349

GAS ANALYSIS

Filed July 13, 1935

WITNESSES
CBWallace.
J. B. Flick

INVENTOR.
John B. Littlefield
BY
Brown, Critchlow & Flick
his ATTORNEYS

Patented Sept. 26, 1939

2,174,349

UNITED STATES PATENT OFFICE 2,174,349

GAS ANALYSIS

John B. Littlefield, Crafton, Pa., assignor to Mine Safety Appliances Company, Pittsburgh, Pa., a corporation of Pennsylvania Application July 13, 1935, Serial No. 31,221

11 Claims. (Cl. 23—232)

This invention relates to gas analysis, and more particularly to determination of the concentration of a gas or a vapor in a gaseous atmosphere.

Hydrogen sulfide is encountered rather widely in a variety of industries, such as in the production and refining of petroleums containing sulfur, in natural gas operations, in mining operations, particularly those involving high sulfide ores, gypsum and sulfur, in gas manufacture, in the manufacture of various chemicals, in underground waters, where it may be encountered in tunneling and caisson work, and in various other connections.

Because hydrogen sulfide is a highly toxic gas, such occurrences have particular significance in relation to industrial safety. It has been reported that one hour exposure to a concentration as low as 0.005 per cent by volume of hydrogen sulfide causes sub-acute poisoning evidenced by respiratory tract irritation and mild conjunctivitis. The degree of poisoning, and the toxicity increase progressively with increasing concentration of this gas, and a concentration of 0.05 to 0.07 per cent by volume may be dangerous upon an exposure of one-half to one hour. Concentrations of 0.07 to 0.1 per cent by volume are quite toxic, causing rapid unconsciousness, with possibility of death; with concentrations above 0.1 per cent a few minutes' exposure is productive of unconsciousness followed by cessation of respiration and death.

The high toxicity of this gas in such low concentrations as just indicated, renders it desirable to have available means for easily and rapidly detecting minute amounts of the gas in industrial atmospheres. The need for this is evidenced by the many cases of poisoning, frequently fatal, which have occurred. The sense of smell does not alone suffice to detect dangerous concentrations because exceedingly low concentrations, below those of toxic significance, are detectable by smell, and because with higher concentrations the olfactory sense becomes paralyzed rapidly upon exposure to atmospheres containing as low as 0.01 per cent H₂S, wherefore the sense of smell can not be relied upon to detect the presence of toxic concentrations of this gas. The usual methods of detection and estimation heretofore available are not adapted for industrial and field operations, either because they afford only qualitative results, or because they require cumbersome, delicate apparatus which is susceptible of use only by trained persons and does not provide rapid results, whereas for industrial purposes rapidity in obtaining knowledge of the concentration is vital.

There are various other gases to which the same condition applies, i. e., for which means for rapidly determining, not only their presence, but primarily their concentration in a gaseous atmosphere, either for safety reasons, or for analytical, control, or other purposes. Examples are carbon monoxide, sulfur dioxide, chlorine gases, such as chlorine and hydrogen chloride, and others. The same situation applies to vapors of normally liquid materials such, for instance, as water vapor.

The invention is adaptable to all such uses, i. e., to determination of a gas or a vapor in air or another gaseous atmosphere. However, because of its widespread industrial occurrence coupled with its highly toxic character, hydrogen sulfide will be referred to particularly herein by way of example, but not of limitation, to illustrate the principle of the invention.

It is among the objects of this invention to provide a simple, rapid and accurate method for estimation of the concentration of a gas or a vapor in a gaseous atmosphere, which is susceptible of practice by unskilled persons, reliable under varying conditions of practice, is adapted to field and plant work, affords direct determination of the gas concentration at all concentrations, and which involves the use of simple, light, and inexpensive apparatus of such character as to be capable of use under all types of conditions.

A further object is to provide a method embodying the foregoing characteristics of the invention and which is especially applicable to determination of hydrogen sulfide, which is reliable under varying conditions of temperature, humidity and place of use, and which is applicable to all concentrations of hydrogen sulfide from those which are harmless, or but slightly harmful, to those which are immediately dangerous.

A further object of the invention is to provide an apparatus for the practice of the foregoing method and which is light, sturdy, capable of use by untrained persons, affords satisfactorily quantitative determinations, and possesses characteristics of adequate stability and reliability.

Figure 2:
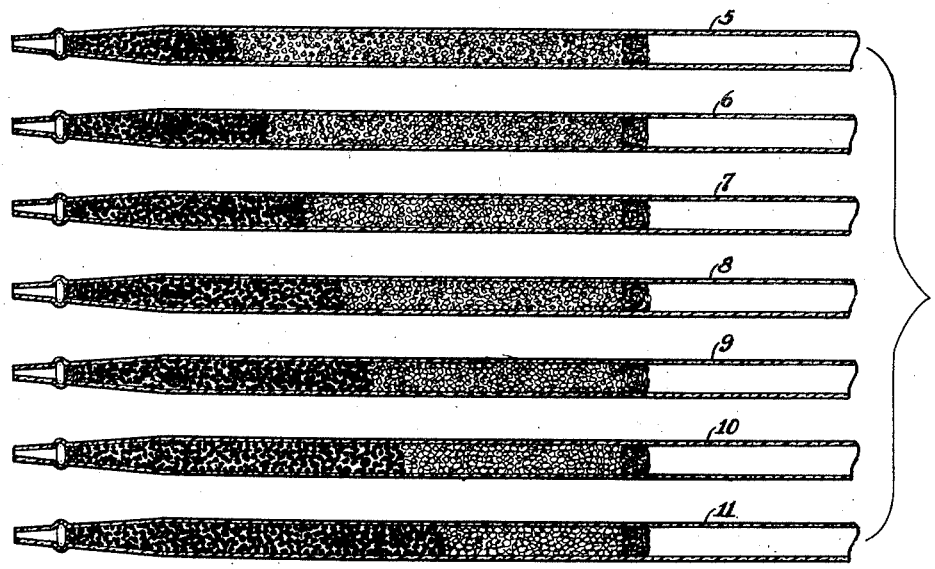

The invention may be described in connection with the accompanying drawing, in which Fig. 1 is a longitudinal sectional view showing, somewhat schematically, an apparatus constructed in accordance with the invention and adapted for the practice of its method; and Fig. 2 a side elevational view of a series of units such as shown in Fig. 1 illustrative of the practice of the invention.

The invention is predicated upon my discovery that estimation of the concentration of a gas or vapor in a gaseous atmosphere may be made rapidly, directly, reliably and with satisfactory accuracy for industrial purposes, by flowing the atmosphere to be tested through an elongate column, or body, of granular material which carries a reagent that gives a color change upon contact with the gas or vapor, and either measuring the volume of atmosphere necessary to produce the color change over a predetermined length of the column or, and preferably, measuring the distance over which the color change occurs longitudinally of the column with a measured amount of atmosphere. In other words, for a given reagent the length over which the color change occurs is fixed by the concentration of the gas or vapor in the atmosphere, so that if conditions, such as character of granular material, reagent and reagent concentration, cross section of bed, and volume of gaseous atmosphere used, are fixed, the length over which the color change occurs will be a direct measure of the concentration. Or, what amounts to the same thing, the volume of atmosphere required to cause reaction over a predetermined length of bed is a direct measure of the concentration of gas or vapor in the atmosphere.

With appropriate reagents the color changes involved in the practice of the invention occur quickly, and since the reaction of the gas or vapor in the gaseous atmosphere with the reagent is rapid, the color developed in the bed of granular material will begin at the entry end and will progress quite evenly and uniformly as the reaction becomes complete. As just noted, with a given bed cross section and granular material, and a given reagent and concentration thereof, the distance the color development travels during the passage of a measured, fixed volume of atmosphere, or, what amounts to the same thing, the volume of atmosphere necessary to produce the color change over a predetermined length, will depend primarily on the concentration of gas or vapor whose concentration is sought to be determined. Consequently either procedure affords a means of directly estimating such concentration rapidly and with sufficient accuracy for industrial purposes.

A variety of granular materials may be used in forming the bed, or column, referred to, such as sand, quartz, and other inert granular materials of like character. More advantageously, however, there are used granular materials of sorptive character, such as silica gel, granulated pumice, and the like. For hydrogen sulfide determination the preferred material is activated alumina, the grade sold under the name "Hydralo" having been found to be particularly suitable. For clarity of observing the color change these granular materials should be white, or at least light in color.

The size of the granules is governed in part by the volume of sample which is passed through the apparatus and the cross-sectional area of the column of granular material used in the apparatus. In general it is desirable to use a column or bed of relatively small cross-sectional area. In order to reduce channeling of the atmosphere in passing through the bed it is desirable to use relatively fine granules of rather uniform size. Actual tests have indicated that for many purposes the granular material should be through 20 and on 30 mesh, most advantageously through 20 and on 24 mesh.

Referring particularly to hydrogen sulfide as illustrative of the invention, a substantial number of reagents are known which undergo color change upon contact with this gas. A number of metallic salts of white or light colors are changed by $H_2S$, to darker colors, such as brown, black, orange or red, depending on the particular metal in the salt. Some metals, such as copper and silver, turn black; sodium nitroprusside upon a white background turns pink; and iodine is liberated by hydrogen sulfide from a slightly acid solution of potassium iodate, so that in the presence of starch a blue color will be produced.

As applied heretofore, however, all such color changes, whether applied to determination of $H_2S$ or other gases, have involved delicate colorimetric methods which are capable of satisfactory application only by trained workers, and which require relatively long periods of time, so that they have not been adapted to industrial operations. Or, as applied to industrial purposes, for example in the form of the familiar lead acetate test paper, they have been merely qualitative in character, and this type of test has not been applied to quantitative uses because the rate of development and uniformity of the color are affected by uncontrollable variations in the procedure, and the rate of development of color for the range of concentrations from those which are hygienically insignificant to those which are highly toxic has been too small to provide any reliable and satisfactory measure of the concentration of gas present. These reagents, however, are indicative of the class which is susceptible of satisfactory use in the practice of the invention.

In the preferred practice of the invention as applied to hydrogen sulfide determination the granules are provided with a coating of, or are impregnated with, silver cyanide. This reagent is desirable because it reacts rapidly with hydrogen sulfide to provide a very pronounced color change, because it is reliable under widely varying conditions of temperature and humidity, and because it is sufficiently stable to light and aging to render it adaptable to commercial purposes. Because it constitutes the present preferred embodiment of the invention, and because its use is illustrative of the application of all of these reagents, it will be referred to hereinafter in describing the invention more in detail.

As exemplifying the preparation of the granular material, activated alumina in granules of appropriate size, for instance as referred to hereinabove, is immersed in a 4 per cent solution of silver nitrate. After being thoroughly impregnated with the solution the granules are suction-dried on a Buchner filter following which they are dried in an oven at about 105° C. for 1½ hours. After this drying they are soaked for a few minutes in a 4 per cent solution of sodium cyanide, and they are then dried in the manner just described. This produces granules coated with a very white form of silver cyanide. Exposure of these granules to light for eighteen months in glass tubes has not materially affected them or reduced their sensitivity to hydrogen sulfide. The chief requirement in the use of this reagent is to avoid any residue of silver nitrate in the granules because the nitrate is adversely affected by a short exposure to light, which will tend to give an erroneous determination.

Other reagents may be applied to the granular material in substantially the same manner, the procedure being modified suitably according to the reagent. For instance, using some metallic salts, such as lead acetate, it suffices merely to soak the granules in the solution and then to dry them in a manner which will avoid decomposition of the reagent.

The apparatus used in the practice of the invention comprises an elongate column, or bed, of the treated granules, and means for passing a measured amount of the atmosphere through the column from one end to the other. A simple form of apparatus, adapted for portable or emergency and the like use, is illustrated in Fig. 1. It comprises a glass tube 1 containing a bed 2 of granular material, such as activated alumina, carrying a reagent, such as silver cyanide. Most suitably the bed is supported between plugs 3 and 3a of absorbent cotton, to maintain the bed tightly packed, or between wire screens or the like serving the same purpose and permitting passage of the atmosphere through the bed. In the form shown tube 1 is formed from glass tubing by drawing down its ends to form small bore necks 4. The reagent material is disposed adjacent one neck, and to the other there is connected aspirating means, such as an aspirator bulb B, for drawing or forcing the atmosphere to be tested through the bed 2. Associated with the tube is a scale S graduated in accordance with the reagent concentration and the standard volume of atmosphere so that the concentration of hydrogen sulfide can be read directly.

To reduce channeling and to give a great length of color change adapted to provide accurate determination for relatively small volumes of atmosphere, the bed, or column, should be of relatively small cross-sectional area.

I have found that a suitable portable apparatus consists of a glass tube having a uniform bore of about 3.5 mm. diameter. In the end 4 having the restricted opening there is placed a plug 3 of absorbent cotton about 2 or 3 mm. thick. Following this there is placed a 5 to 6 cm. length of granular material which is gravity packed by tamping the tube lightly. Another plug 3a of absorbent cotton is placed above the open end to keep the material firmly in place.

The atmosphere may be either aspirated, or drawn, through the apparatus, or it may be forced through, the essential requirement being that a predetermined, or measured, volume of the atmosphere be passed through the tube, as by an aspirator bulb or constant volume pump, in order to obtain substantially quantitative results. Using an aspirator bulb, two equivalent procedures are possible, i. e., passing a predetermined volume of atmosphere through the tube and measuring the length over which the color change occurs, or, what amounts to the same thing, measuring the volume of air necessary to cause the color change to occur along a predetermined length of the granular bed. Both procedures are based upon the fact that the color change is proportional to the concentration of hydrogen sulfide, and therefore the extent of change is dependent upon the volume of atmosphere passed through the tubing.

A desideratum of determination of hydrogen sulfide industrially is that the method and apparatus shall be reliable and accurate under varying conditions of temperature and humidity, since both of these factors may vary widely in industrial and field work. Particularly is this necessary where the determination is dependent on the rate of chemical reaction in the existing temperature of use. Tests of the invention have shown that it is adapted to satisfactory operation under such varying conditions.

As showing the reliability and applicability of the invention, reference may be made to the tests reported in Table I. In these tests there was used granular material made from activated alumina of 20 to 30-mesh size which had been heated for two hours at 800° C. A 20 gm. portion of this material was washed in 50 cc. of a 4 per cent aqueous solution of silver nitrate ($AgNO_3$). The granules were then dried five minutes on a Buchner funnel, then one hour in an oven at 105° C. After cooling the grains were washed until white in a 4 per cent solution of sodium cyanide (NaCN), dried five minutes on a Buchner funnel, and then dried one and three-quarter hours at 105° C. in an oven. Tubes were prepared as described in the foregoing specific example, and $H_2S$-air mixtures of known concentration were passed through them. The volume of the air-$H_2S$ mixture used was constant: 5 squeezes of an aspirator bulb passed 72 cc. per squeeze. The tests showed the following results:

TABLE I

*$H_2S$-air mixtures—silver cyanide reagent*

| $H^2S$ vol. percent | Temp., °C. | Rel. humidity, percent | Height of color change, mm. | |
|---|---|---|---|---|
| | | | Average | Group mean |
| 0.0025 | 23 | 50 | 4.0 | |
| 0.0025 | 23 | Dry* | 4.5 | |
| 0.0025 | −22 | Dry | 4.0 | 4.2 |
| 0.005 | 23 | 50 | 6.0 | |
| 0.005 | 23 | Dry | 7.0 | |
| 0.005 | −21 | do | 6.5 | 6.5 |
| 0.01 | 23 | 50 | 10.5 | |
| 0.01 | 25 | Dry | 11.0 | |
| 0.01 | −21 | do | 10.5 | 10.6 |
| 0.02 | 23 | 50 | 14.0 | |
| 0.02 | 25 | Dry | 16.0 | |
| 0.02 | −21 | do | 16.5 | 15.8 |
| 0.03 | 23 | 50 | 17.5 | |
| 0.03 | 25 | Dry | 19.5 | |
| 0.03 | −21 | do | 20.5 | 19.2 |
| 0.04 | 23 | 50 | 23.5 | |
| 0.04 | 25 | Dry | 24.0 | |
| 0.04 | −21 | do | 23.5 | 23.7 |
| 0.05 | 23 | 50 | 26.5 | |
| 0.05 | 25 | Dry | 29.0 | |
| 0.05 | −21 | do | 27.5 | 28.0 |

*The "dry" samples were made by adding $H^2S$ to air that had been circulated through $CaCl^2$.

It will be observed that under conditions of temperature varying from minus 22° C. to plus 23° C., and from dryness to relative humidity of 50 per cent, each concentration of hydrogen sulfide in air produces reaction over a definite length of the bed. While there may be minor variations in the distance over which reaction occurs for a given concentration of $H_2S$, due to changes in test conditions, nevertheless each concentration of hydrogen sulfide causes the length over which reaction occurs to be of a distinct order of magnitude.

It will be seen from Table I that in the use of such a method and apparatus the passage of a definite volume of atmosphere through the apparatus gives a direct measure of the amount of hydrogen sulfide present. This is indicated in Fig. 2, in which a series of tubes 5, 6, 7, 8, 9, 10 and 11 each received the same amount of H₂S-air atmospheres containing, respectively, 0.0025—0.005—0.01—0.02—0.03—0.04—0.05 per cent by volume of hydrogen sulfide. The progression of the length of reaction is clearly evident. Fig. 2 was made from an actual set of tubes tested as just stated. It will be seen that the tube itself can be calibrated in terms of percentage of hydrogen sulfide, or that a scale may be used with it which has been calibrated for the particular reagent, size of tube, and volume of air passed through it.

For most purposes the volume of air is controlled by using an aspirator bulb of fixed volume and giving it a standard number of squeezes, permitting the bulb to fill completely between each squeeze.

The concentration of reagent carried by the granules should be appropriate to the probable concentration range of the gas, so that the reaction will be completed rapidly to give progressive color change, and to give such a length of color change as to provide the necessary accuracy. Thus, for low concentrations of gas or vapor, low concentrations of reagent are desirable because thereby the reaction occurs rapidly enough to avoid false indications due to gas moving along the column before the reagent behind it has been exhausted, and because this provides a longer column indication, making it easier to accurately determine the gas concentration. For example, for atmospheres containing up to 0.05 per cent of H₂S the granules are advantageously made using a 4 per cent solution of silver nitrate as described hereinabove. For greater concentrations, say up to 0.1 per cent of H₂S, the silver concentration should be increased, for instance by using a 12 per cent solution of silver nitrate.

Table II shows the application of the invention to the embodiment in which there is determined the volume of air necessary to produce a definite length of color change. It shows that the volume of atmosphere, as measured by the number of squeezes of the bulb, necessary to effect reaction over a given length, varies according to the concentration of hydrogen sulfide. This procedure is applicable to the direct determination of hydrogen sulfide just as in the procedure just described.

TABLE II

| H₂S vol., percent | Squeezes of bulb No. | Volume of sample, cc. |
|---|---|---|
| 0.0025 | 40 | 2880 |
| 0.005 | 25 | 1800 |
| 0.01 | 7 | 504 |
| 0.02 | 4 | 288 |
| 0.03 | 2 | 144 |
| 0.04 | 1.5 | 108 |
| 0.05 | 1 | 72 |

For industrial purposes it is an essential that apparatus of this type shall possess qualities of stability to aging and other influences. As stated above, the silver cyanide reagent is stable for long periods of time against light change, so that this factor does not affect the reliability of the apparatus. Tests have shown also that this reagent when allowed to stand for periods as long as eighteen months does not deteriorate, even when the ends of the tubes are not sealed. This is evidenced by the tests reported in Table III, which show that after that length of time the various concentrations of hydrogen sulfide tested produce color changes over lengths of the granular bed of the same order of magnitude as those reported in Table I, showing the apparatus to possess suitable stability and reliability.

TABLE III

*Silver cyanide reagent aged 18 months—H₂S-air mixtures*

| H₂S vol., percent | Temp., °C. | Humidity, percent | Height of color, mm. | |
|---|---|---|---|---|
| | | | After 18 mo. | Fresh material |
| 0.0025 | 24 | 58 | 4.6 | *4.2 |
| 0.005 | 24 | 58 | 8.3 | 6.5 |
| 0.01 | 24 | 58 | 11.0 | 10.6 |
| 0.02 | 24 | 58 | 15.2 | 15.8 |
| 0.03 | 24 | 58 | 19.4 | 19.2 |
| 0.04 | 24 | 58 | 24.3 | 23.7 |
| 0.05 | 24 | 58 | 28.5 | 28.0 |

* Data in this column from Table I.

The silver cyanide reagent is applicable also with atmospheres containing gases in addition to hydrogen sulfide and the normal constituents of air without materially impairing the results obtained, which is a feature of substantial importance since industrial atmospheres may contain a variety of gases or vapors not normally present in air. For example, tests have shown that natural gas, carbon monoxide, carbon dioxide, sulfur dioxide in concentrations up to 1.2 per cent, or atmospheres saturated with the vapors of gasoline, methyl and ethyl alcohol, and concentrated chlorine atmospheres, do not cause any change in length of color of, for example, the silver cyanide reagent.

Mercaptans and similar organic sulfur compounds will, in general, produce a color change like that produced by hydrogen sulfide. This, however, is an advantage because these organic sulfides properly are classed with hydrogen sulfide as toxic agents, since they tend to produce the same paralyzing action on the central nervous system. Accordingly it is desirable that they react positively to the test, as they do.

Other reagents, for instance lead acetate, may also be used for hydrogen sulfide determination. The latter reagent tends to produce a longer length of color change than silver cyanide and the reaction is not significantly affected by changes in temperature. However, for most purposes this reagent is not as desirable as the silver cyanide reagent.

As stated hereinabove, the invention is applicable also to determination of gases other than hydrogen sulfide. The reagent used will depend, of course, upon the particular gas or vapor in question, and perhaps on other constituents of the atmosphere, but for most cases a major desideratum is that the reaction shall proceed rapidly. Reagents undergoing color change are known for the individual gases and vapors, and in many instances a selection is possible. Thus, anhydrous cobaltous chloride and copper sulfate both undergo a color change upon hydration, and being readily and rapidly hydrated, are susceptible of application to determining water vapor. Carbon monoxide causes a color change of several reagents, a well-known example being palladium (ous) chloride.

The invention is applicable not only to determining toxic and the like gases, but also to ascertaining whether an atmosphere is deficient in some gaseous constituent. For instance, it may be applied to ascertain whether there is such oxygen deficiency in an atmosphere as to render it unfit for breathing. Oxidizable agents undergoing color change on oxidation afford suitable reagents for such purposes.

The silver cyanide reagent described may be used to determine chlorine gases by exposing the tube to light for one or two hours after passing the atmosphere through it. Chlorine gases under such conditions cause the development of a blue color.

According to the provisions of the patent statutes, I have explained the principle and mode of practicing my invention, and have illustrated and described what I now consider to represent its best embodiment. However, I desire to have it understood that, within the scope of the appended claims, the invention may be practiced otherwise than as specifically illustrated and described.

I claim:

1. That method of determining the concentration of a constituent of a gaseous atmosphere which comprises flowing a predetermined volume of the atmosphere to be tested through an elongate bed of granular material carrying a salt reagent which upon contact with said constituent changes color over a length which is dependent upon the concentration of said constituent in the atmosphere, said color change being substantially independent of the concentration of said constituent and measuring said length.

2. That method of determining the concentration of a constituent of a gaseous atmosphere which comprises flowing a predetermined volume of the atmosphere to be tested through an elongate bed of granular sorptive material carrying a reagent which upon contact with said constituent changes color over a length which is dependent upon the concentration of said constituent in the atmosphere, said color change being substantially independent of the concentration of said constituent and measuring said length.

3. That method of determining the concentration of a constituent of a gaseous atmosphere which comprises flowing a predetermined volume of the atmosphere to be tested through an elongate relatively small cross-sectional area bed of activated alumina granules carrying a reagent which upon contact with said constituent changes color over a length which is dependent upon the concentration of said constituent in the atmosphere, said color change being substantially independent of the concentration of said constituent, and measuring said length.

4. That method of determining the concentration of a constituent of a gaseous atmosphere which comprises flowing a predetermined volume of the atmosphere to be tested through an elongate relatively small cross-sectional area bed of granular sorptive material carrying a metallic salt reagent which upon contact with said constituent changes color over a length which is dependent upon the concentration of said constituent in the atmosphere, said color change being substantially independent of the concentration of said constituent, and measuring said length.

5. That method of determining the concentration of a constituent of a gaseous atmosphere which comprises flowing the atmosphere to be tested through an elongate bed of granular material carrying a reagent which upon contact with said constituent changes color over a length which is dependent upon the concentration of said constituent in the atmosphere, said color change being substantially independent of the concentration of said constituent, and determining the volume of said atmosphere necessary to produce said color change over a predetermined length of the bed, said volume being proportional to and thereby indicating the concentration of said constituent in the atmosphere.

6. That method of determining the concentration of a constituent of a gaseous atmosphere which comprises flowing the atmosphere to be tested through an elongate relatively small cross-sectional area bed of granular sorptive material carrying a metallic salt reagent which upon contact with said constituent changes color over a length which is dependent upon the concentration of said constituent in the atmosphere, said color change being substantially independent of the concentration of said constituent, and determining the volume of said atmosphere necessary to produce said color change over a predetermined length of the bed, said volume being proportional to and thereby indicating the concentration of said constituent in the atmosphere.

7. That method of determining the concentration of a constituent of a gaseous atmosphere which comprises flowing the atmosphere to be tested through an elongate relatively small cross-sectional area bed of activated alumina granules carrying a reagent which upon contact with said constituent changes color over a length which is dependent upon the concentration of said constituent in the atmosphere, said color change being substantially independent of the concentration of said constituent, and determining the volume of said atmosphere necessary to produce said color change over a predetermined length of the bed, said volume being proportional to and thereby indicating the concentration of said constituent in the atmosphere.

8. A method according to claim 4, said constituent being hydrogen sulfide, and said salt being one which changes color on contact with hydrogen sulfide.

9. That method of estimating the concentration of hydrogen sulfide in a gaseous atmosphere which comprises flowing a predetermined volume of the atmosphere to be tested through an elongate relatively small cross-sectional area bed of granular sorptive material carrying silver cyanide and thereby causing color change to occur over a length of said bed which is dependent on the concentration of hydrogen sulfide in the atmosphere, and measuring said length.

10. That method of estimating the concentration of hydrogen sulfide in a gaseous atmosphere which comprises flowing a predetermined volume of the atmosphere to be tested through an elongate bed of activated alumina granules impregnated with silver cyanide and thereby causing color change to occur over a length of said bed which is dependent on the concentration of hydrogen sulfide in the atmosphere, and measuring said length.

11. That method of estimating the concentration of hydrogen sulfide in a gaseous atmosphere which comprises flowing the atmosphere through an elongate relatively small cross-sectional area bed of granular activated alumina impregnated with silver cyanide, and determining the volume of said atmosphere necessary to produce said color change over a predetermined length of the bed, said volume being substantially proportional to, and thereby indicating, the concentration of hydrogen sulfide in the atmosphere.

JOHN B. LITTLEFIELD.